United States Patent
Chang et al.

(10) Patent No.: US 12,085,301 B2
(45) Date of Patent: Sep. 10, 2024

(54) OUTDOOR UNIT, AIR CONDITIONER, AND METHOD FOR CONTROLLING AIR CONDITIONER

(71) Applicant: HISENSE AIR CONDITIONING CO., LTD., Qingdao (CN)

(72) Inventors: Qian Chang, Qingdao (CN); Dajun Li, Qingdao (CN); Chunfeng Xu, Qingdao (CN); Xifeng Zhao, Qingdao (CN); Lintao Wu, Qingdao (CN); Wei Liu, Qingdao (CN)

(73) Assignee: HISENSE AIR CONDITIONING CO., LTD., Qingdao (CN)

( * ) Notice: Subject to any disclaimer, the term of this patent is extended or adjusted under 35 U.S.C. 154(b) by 197 days.

(21) Appl. No.: 18/047,722

(22) Filed: Oct. 19, 2022

(65) Prior Publication Data

US 2023/0104997 A1 Apr. 6, 2023

Related U.S. Application Data

(63) Continuation of application No. PCT/CN2021/116351, filed on Sep. 3, 2021.

(30) Foreign Application Priority Data

Jul. 3, 2020 (CN) .......................... 202010631063.2

(51) Int. Cl.
*F24F 11/871* (2018.01)
*F24F 1/32* (2011.01)
(Continued)

(52) U.S. Cl.
CPC .............. *F24F 11/871* (2018.01); *F24F 1/32* (2013.01); *F24F 11/64* (2018.01); *F24F 2140/12* (2018.01)

(58) Field of Classification Search
CPC .. F24F 11/871; F24F 11/64; F24F 1/32; F24F 2140/12; F24F 11/77; F24F 11/86
See application file for complete search history.

(56) References Cited

U.S. PATENT DOCUMENTS

| | | | | |
|---|---|---|---|---|
| 4,644,756 A | * | 2/1987 | Sugimoto | F24F 1/0071 62/200 |
| 5,531,076 A | * | 7/1996 | Pellenz | F24F 3/065 62/428 |

(Continued)

FOREIGN PATENT DOCUMENTS

| | | |
|---|---|---|
| CA | 2883276 A1 | 9/2015 |
| CN | 105402845 A | 3/2016 |

(Continued)

OTHER PUBLICATIONS

International Search Report and Written Opinion dated Nov. 22, 2021 in corresponding International Application No. PCT/CN2021/116351, translated, 14 pages.

(Continued)

*Primary Examiner* — Nelson J Nieves
(74) *Attorney, Agent, or Firm* — MH2 TECHNOLOGY LAW GROUP LLP

(57) ABSTRACT

An outdoor unit includes a pressure sensor for detecting an internal pressure of a first pipe. An outdoor unit controller is configured to: receive a switching signal; control an outdoor fan and a compressor to operate in a case where the switching signal instructs the outdoor unit to operate, the compressor operating at a first frequency; acquire a current state of the indoor fan in a case where the on signal instructs the outdoor unit to shut down; and control the compressor and the outdoor fan to operate if the current state of the indoor fan is an operating state, the compressor operating at a second frequency. The second frequency is lower than the (Continued)

first frequency. The current state of the indoor fan is obtained according to the internal pressure of the first pipe.

20 Claims, 4 Drawing Sheets

(51) Int. Cl.
*F24F 11/64* (2018.01)
*F24F 140/12* (2018.01)

(56) References Cited

U.S. PATENT DOCUMENTS

| | | | |
|---|---|---|---|
| 2008/0245084 A1* | 10/2008 | Song | F24F 11/77 62/158 |
| 2013/0180690 A1* | 7/2013 | Yura | F25B 13/00 165/121 |
| 2015/0253050 A1 | 9/2015 | Goel et al. | |
| 2019/0154321 A1* | 5/2019 | Takenaka | F25B 47/025 |
| 2019/0234643 A1* | 8/2019 | Yamada | F25B 5/02 |
| 2020/0096232 A1* | 3/2020 | Branecky | F24H 9/2035 |
| 2021/0071888 A1* | 3/2021 | Mowris | F24F 11/88 |
| 2022/0099346 A1* | 3/2022 | Alfano | F25B 39/00 |
| 2022/0349600 A1* | 11/2022 | Alfano | G01M 3/182 |
| 2024/0011655 A1* | 1/2024 | Puranen | F24F 11/42 |
| 2024/0191895 A1* | 6/2024 | Peng | F24F 11/36 |

FOREIGN PATENT DOCUMENTS

| | | | |
|---|---|---|---|
| CN | 105757884 A | 7/2016 | |
| CN | 106524415 A | 3/2017 | |
| CN | 106642519 A | 5/2017 | |
| CN | 107255306 A | 10/2017 | |
| CN | 107525234 A | 12/2017 | |
| CN | 107575999 A | 1/2018 | |
| CN | 107860103 A | 3/2018 | |
| CN | 108224707 A | 6/2018 | |
| CN | 108954659 A | 12/2018 | |
| CN | 110848898 A | 2/2020 | |
| CN | 210197601 U | 3/2020 | |
| CN | 111623420 A | 9/2020 | |
| CN | 111780362 A | 10/2020 | |
| EP | 1972861 A2 | 9/2008 | |
| JP | 2010261698 A * | 11/2010 | F24F 11/0076 |
| KR | 1020060066439 A | 6/2006 | |
| KR | 100851906 B1 | 8/2008 | |
| WO | 2014165497 A1 | 10/2014 | |

OTHER PUBLICATIONS

Notification to Grant Patent Right for Invention dated Feb. 14, 2022 in corresponding Chinese Application No. 202010631063.2, translated, 9 pages.
First Chinese Office Action dated Apr. 14, 2021 in corresponding Chinese Application No. 202010631063.2, translated, 24 pages.
Second Chinese Office Action dated Sep. 6, 2021 in corresponding Chinese Application No. 202010631063.2, translated, 22 pages.

* cited by examiner

OUTDOOR UNIT, AIR CONDITIONER, AND METHOD FOR CONTROLLING AIR CONDITIONER

CROSS-REFERENCE TO RELATED APPLICATIONS

This application is a continuation application of International Application No. PCT/CN2021/116351, with an international filing date of 3 Sep. 2021, which claims priority to Chinese Patent Application No. 202010631063.2, filed with the Chinese Patent Office on Jul. 3, 2020, both of which are incorporated herein by reference in their entirety.

TECHNICAL FIELD

The present disclosure relates to the technical field of air conditioners and, in particular, to an outdoor unit, an air conditioner, and a method for controlling an air conditioner.

BACKGROUND

The switching signal (e.g., a switching signal of 24V) and the code signal are two communication means between an indoor unit and an outdoor unit of an air conditioner.

Compared with the switching signal, the code signal can form a variety of signals through program codes, and thus it can carry more information, such as operating parameters of the indoor unit and the outdoor unit required by variable-frequency control. Therefore, the code signal is applied to the variable-frequency air conditioner. The variable-frequency air conditioner transmits the operating parameters between the indoor unit and the outdoor unit based on the code signal, thereby performing variable-frequency control based on the operating parameters.

Compared with the code signal, the switching signal has only two types of signals, i.e., a high-level signal and a low-level signal, and cannot carry more information, such as the aforementioned operating parameters, and thus is applied to the constant-frequency air conditioner. The indoor unit transmits a power-on signal (e.g., a high-level signal) and a power-off signal (e.g., a low-level signal) to the outdoor unit based on the switching signal, and the outdoor unit operates at a constant frequency when receiving the power-on signal and stops operating when receiving the power-off signal.

SUMMARY

In a first aspect, an outdoor unit is provided. The outdoor unit includes an outdoor fan, an outdoor heat exchanger, a compressor, a pressure sensor, and an outdoor unit controller. The outdoor fan is configured to, when in an operating state, suck outdoor air into the outdoor unit and output heat-exchanged outdoor air from the outdoor unit. The outdoor heat exchanger is configured to perform heat exchange between the outdoor air and a refrigerant transported in the outdoor heat exchanger to obtain the heat-exchanged outdoor air. The compressor is configured to, when in an operating state, compress the refrigerant. The pressure sensor is configured to detect an internal pressure of a first pipe, and the first pipe is a pipe connecting an indoor unit of an air conditioner; and the indoor unit includes an indoor heat exchanger, and the first pipe is connected between the compressor and the indoor heat exchanger. The outdoor unit controller is coupled to the pressure sensor, the compressor, and the outdoor fan. The outdoor unit controller is configured to: receive a switching signal, the switching signal being a signal output by the indoor unit and used for instructing the outdoor unit to operate or shut down, the indoor unit further including an indoor fan including an operating state and a shutdown state; control the outdoor fan and the compressor to be in an operating state in a case where the switching signal instructs the outdoor unit to operate, an operating frequency of the compressor being a first frequency; acquire a current state of the indoor fan in a case where the switching signal instructs the outdoor unit to shut down, the current state of the indoor fan being one of the operating state and the shutdown state; the current state of the indoor fan being determined according to an internal pressure of the first pipe; and control the compressor and the outdoor fan to operate if the current state of the indoor fan is the operating state, an operating frequency of the compressor being a second frequency, the second frequency being lower than the first frequency.

In a second aspect, an air conditioner is provided. The air conditioner includes an indoor unit and the outdoor unit provided in the first aspect. The indoor unit includes an indoor heat exchanger, an indoor fan, and an indoor unit controller. The indoor unit controller is configured to control the indoor fan to switch between an operating state and a shutdown state and is further configured to control output of a switching signal. The switching signal is configured to instruct the outdoor unit to operate or stop operating.

In a third aspect, a method for controlling an air conditioner is provided, which is applied to an outdoor unit. The outdoor unit includes an outdoor fan, an outdoor heat exchanger, a compressor, a pressure sensor, and an outdoor unit controller. The outdoor fan is configured to, when in an operating state, suck outdoor air into the outdoor unit and output heat-exchanged outdoor air from the outdoor unit. The outdoor heat exchanger is configured to perform heat exchange between the outdoor air and a refrigerant transported in the outdoor heat exchanger to obtain the heat-exchanged outdoor air. The compressor is configured to, when in an operating state, compress the refrigerant. The pressure sensor is configured to detect an internal pressure of a first pipe, and the first pipe is a pipe connecting an indoor unit of an air conditioner; and the indoor unit includes an indoor heat exchanger, and the first pipe is connected between the compressor and the indoor heat exchanger. The outdoor unit controller is coupled to the pressure sensor, the compressor, and the outdoor fan. The method for controlling the air conditioner includes: receiving a switching signal, the switching signal being a signal output by the indoor unit and used for instructing the outdoor unit to operate or shut down, the indoor unit further including an indoor fan including an operating state and a shutdown state; control the outdoor fan and the compressor to be in an operating state in a case where the switching signal instructs the outdoor unit to operate, an operating frequency of the compressor being a first frequency; acquire a current state of the indoor fan in a case where the switching signal instructs the outdoor unit to shut down, the current state of the indoor fan being one of the operating state and the shutdown state; the current state of the indoor fan being determined according to an internal pressure of the first pipe; and control the compressor and the outdoor fan to operate if the current state of the indoor fan is the operating state, an operating frequency of the compressor being a second frequency, the second frequency being lower than the first frequency.

Figure 1:
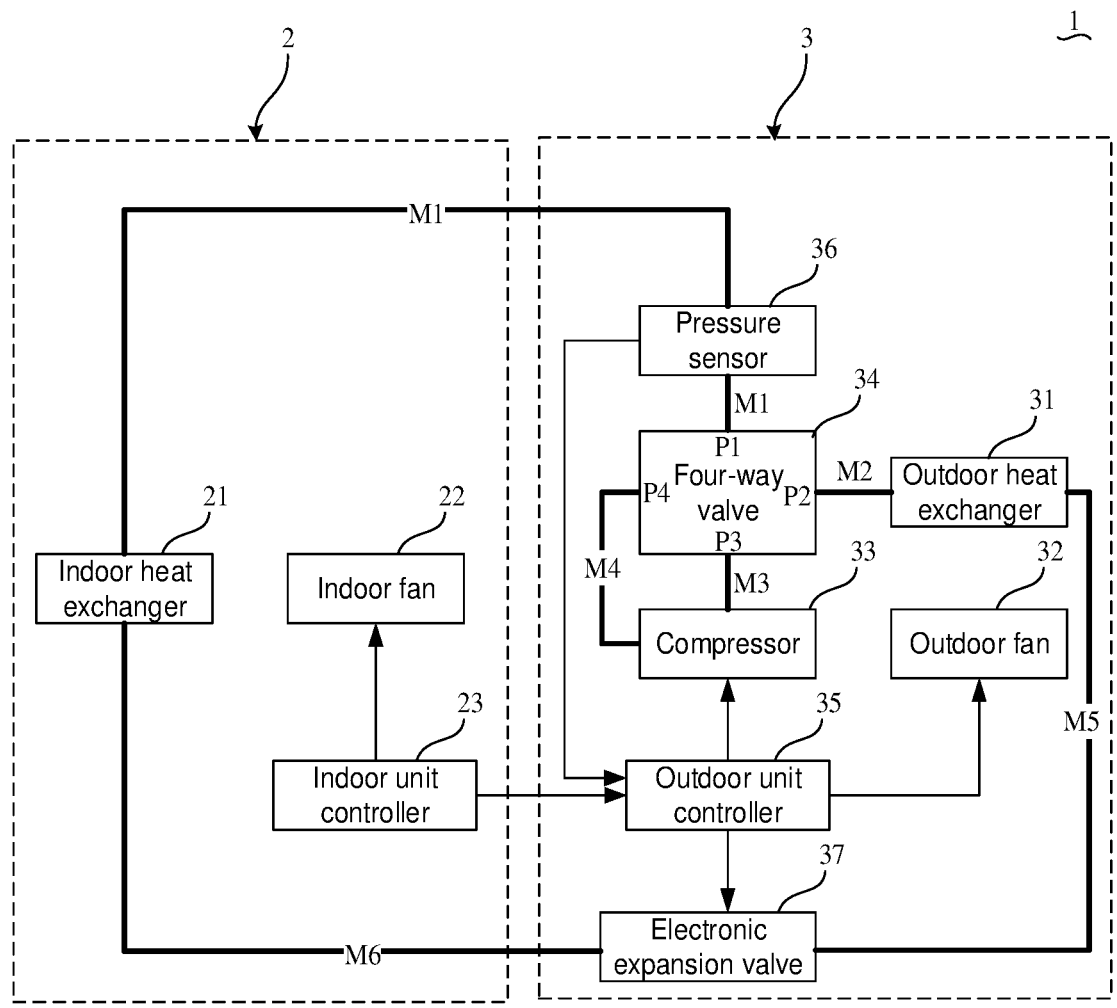
FIG. 1 is a schematic diagram showing a structure of an air conditioner according to some embodiments.

1—Air conditioner
2—Indoor unit
21—Indoor heat exchanger
22—Indoor fan
23—Indoor unit controller
3—Outdoor unit
31—Outdoor heat exchanger
32—Outdoor fan
33—Compressor
34—Four-way valve
35—Outdoor unit controller
36—Pressure sensor
37—Electronic expansion valve
38—Gas-liquid separator
P1—First port
P2—Second port
P3—Third port
P4—Fourth port
M1—First pipe
M2—Second pipe
M3—Third pipe
M4—Fourth pipe
M5—Fifth pipe
M6—Sixth pipe
IO21—First in-and-out port of indoor heat exchanger
IO22—Second in-and-out port of indoor heat exchanger
IO31—First in-and-out port of outdoor heat exchanger
IO32—Second in-and-out port of outdoor heat exchanger

DETAILED DESCRIPTION

The technical solutions in some embodiments of the present disclosure will be described clearly and completely with reference to the accompanying drawings; obviously, the described embodiments are merely some but not all of embodiments of the present disclosure. All other embodiments obtained on a basis of the embodiments of the present disclosure by a person of ordinary skill in the art shall be included in the protection scope of the present disclosure.

Unless the context requires otherwise, throughout the specification and claims, the term "comprise" and other forms thereof such as the third-person singular form "comprises" and the present participle form "comprising" are construed as an open and inclusive meaning, i.e., "including, but not limited to. In the description of the specification, the terms such as "one embodiment", "some embodiments", "exemplary embodiments", "example", "specific example" or "some examples" are intended to indicate that specific features, structures, materials, or characteristics related to the embodiment(s) or example(s) are included in at least one embodiment or example of the present disclosure. Schematic representations of the above terms do not necessarily refer to the same embodiment(s) or example(s). In addition, specific features, structures, materials, or characteristics described herein may be included in any one or more embodiments or examples in any suitable manner.

Hereinafter, the terms such as "first" and "second" are only used for descriptive purposes and cannot be construed as indicating or implying the relative importance or implicitly indicating the number of indicated technical features. Therefore, the features defined with "first" and "second" may explicitly or implicitly include one or more of these features. In the description of the embodiments of the present disclosure, the terms "a plurality of" and "the plurality of" each mean two or more unless otherwise specified.

In describing some embodiments, the expressions "coupled" and "connected" and their derivatives may be used. For example, the term "connected" may be used when describing some embodiments to indicate that two or more components are in direct physical or electrical contact with each other. For another example, the term "coupled" may be used when describing some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

As used herein, depending on the context, the term "if" is optionally interpreted to mean "when" or "in a case where" or "in response to determination" or "in response to detection." Similarly, the phrase "if it is determined" or "if [a stated condition or event] is detected," depending on the context, is optionally construed as "in a case where it is determined" or "in response to determining" or "in a case where [the stated condition or event] is detected" or "in response to detecting [the stated condition or event]."

The use of the phrase "applicable to" or "configured to" herein means an open and inclusive expression, which does not exclude devices that are applicable to or configured to perform additional tasks or steps.

In addition, the phrase "based on" used herein has an open and inclusive meaning, since a process, step, calculation, or other action that is "based on" one or more of the stated conditions or values may, in practice, be based on additional conditions or values exceeding those stated.

FIG. 1 is a schematic diagram showing a structure of an air conditioner according to some embodiments. It will be noted that, in practice, an air conditioner 1 may have more or fewer components than those shown in the figure, which is not limited herein. Referring to FIG. 1, the air conditioner 1 includes an indoor unit 2. For example, the indoor unit 2 may be a vertical machine. The air conditioner 1 further includes an outdoor unit 3, and the outdoor unit 3 is generally installed outdoors. The indoor unit 2 and the outdoor unit 3 are connected by a pipe to transport a refrigerant. Furthermore, the air conditioner 1 may also be operated by a control device, such as a terminal APP (application program) or a remote controller. The remote controller is taken as an example, and the remote controller has a function of communicating with the indoor unit 2 by using, for example, infrared rays or other communication means. The remote controller may be used for various controls of the air conditioner 1 by a user to achieve interaction between the user and the air conditioner 1. It will be understood that, in other embodiments, the remote controller may not be a part of the air conditioner 1.

Structures of the indoor unit 2 and the outdoor unit 3 will be described below.

[The Indoor Unit 2]

As shown in FIG. 1, the indoor unit 2 includes an indoor heat exchanger 21, an indoor fan 22, and an indoor unit controller 23.

The indoor heat exchanger 21 is configured to perform heat exchange between indoor air and a refrigerant transported in the indoor heat exchanger 21. It will be understood that the indoor air refers to the air inside the room where the indoor unit 2 is located. Accordingly, the air outdoors where the outdoor unit 3 is located is outdoor air. For example, the indoor heat exchanger 21 operates as an evaporator in a cooling mode of the air conditioner 1, so that the refrigerant that has been heat-dissipated via the outdoor heat exchanger 31 passes through the indoor heat exchanger 21 to absorb heat in the indoor air to be evaporated. The indoor heat exchanger 21 operates as a condenser in a heating mode of the air conditioner 1, so that the refrigerant that has absorbed heat via the outdoor heat exchanger 31 passes through the indoor heat exchanger 21 to dissipate heat into the indoor air to be condensed.

Generally, the indoor heat exchanger 21 further includes heat exchange fins to enlarge a contact area between the indoor air and the refrigerant transported in the indoor heat exchanger 21, thereby improving heat exchange efficiency between the indoor air and the refrigerant.

The indoor fan 22 is driven to rotate by an indoor fan motor whose rotational speed can be changed. Driven by the indoor fan motor, the indoor fan 22 generates airflow of the indoor air passing through the indoor heat exchanger 13, so as to promote heat exchange between the refrigerant flowing in a heat transfer pipe of the indoor heat exchanger 21 and the indoor air.

It will be noted that a state of the indoor fan 22 includes an operating state and a shutdown state. The "operating state" refers to a state in which the indoor fan 22 rotates under driving of the indoor fan motor. The "shutdown state" refers to a state in which the indoor fan 22 is stopped and does not rotate.

The indoor unit controller 23 is coupled to the indoor fan 22, and is configured to control the indoor fan 22, e.g., to control the state of the indoor fan 22 to switch between the operating state and the shutdown state, or to control an operating frequency of the indoor fan 22. The indoor unit controller 23 may be configured to include, for example, a processor and a memory, and a structure capable of controlling the indoor unit 2 in accordance with a program stored in the memory. The processor includes, for example, a central processing unit (CPU), a microprocessor, an application specific integrated circuit (ASIC), a chip, or a programmable logic device (such as a field programmable gate array (FPGA)).

[The Outdoor Unit 3]

The outdoor unit 3 includes an outdoor heat exchanger 31, an outdoor fan 32, a compressor 33, a four-way valve 34, an electronic expansion valve 37, and an outdoor unit controller 35.

The outdoor heat exchanger 31 is configured to perform heat exchange between the outdoor air and the refrigerant transported in the outdoor heat exchanger 31. For example, the outdoor heat exchanger 31 operates as a condenser in a cooling mode of the air conditioner 1, so that the refrigerant compressed by the compressor 33 passes through the outdoor heat exchanger 31 to dissipate heat into the outdoor air to be condensed. The outdoor heat exchanger 31 operates as an evaporator in a heating mode of the air conditioner 1, so that the decompressed refrigerant passes through the outdoor heat exchanger 31 to absorb heat in the outdoor air to be evaporated.

Generally, the outdoor heat exchanger 31 further includes heat exchange fins to enlarge a contact area between the outdoor air and the refrigerant transported in the outdoor heat exchanger 31, thereby improving heat exchange efficiency between the outdoor air and the refrigerant.

The outdoor fan 32 is used to promote heat exchange between the refrigerant flowing in the heat transfer pipe of the outdoor heat exchanger 31 and the outdoor air. A working principle and an implementation of the outdoor fan 32 are similar to those of the indoor fan 22, and reference can be made to the indoor fan 22. It will be noted that a state of the outdoor fan 32 may be implemented with reference to the state of the indoor fan 22.

The compressor 33 is configured to compress the refrigerant, so that low-temperature and low-pressure refrigerant is compressed to form high-temperature and high-pressure refrigerant. The compressor 33 may be a variable-capacity inverter compressor 33 whose rotational speed is controlled based on an inverter. It will be noted that a state of the compressor 33 also includes an operating state and a shutdown state. The "operating state" of the compressor 33 refers to a state in which the compressor 33 is rotating. The "shutdown state" of the compressor 33 refers to a state in which the compressor 33 is stopped and does not rotate.

The four-way valve 34 is configured to switch a flow direction of the refrigerant, so that the air conditioner 1 performs a cooling mode or a heating mode.

For example, the four-way valve 34 includes a first port P1, a second port P2, a third port P3, and a fourth port P4. The first port P1 is connected to the indoor heat exchanger 21 through a first pipe M1 (hereinafter referred to as an E pipe). The second port P2 is connected to the outdoor heat exchanger 31 through a second pipe M2 (hereinafter referred to as a C pipe). The third port P3 is connected to a discharge port of the compressor 33 through a third pipe M3 (hereinafter referred to as a D pipe). The fourth port P4 is connected to a suction port of the compressor 33 through a fourth pipe M4 (hereinafter referred to as an S pipe). In addition, the outdoor heat exchanger 31 is connected to the electronic expansion valve 37 through a fifth pipe M5, and the electronic expansion valve 37 is connected to the indoor heat exchanger 21 through a sixth pipe M6. Of course, in other embodiments, in order to form a refrigerant circulation loop, the four-way valve 34 may also be replaced with other valves that can provide a four-way reversing function, such as a six-way valve, an eight-way valve, etc., or even the refrigerant circulation loop may be achieved directly through more complex piping connections between components, thereby eliminating provision of the four-way valve 34, which is not limited by the present disclosure.

When the air conditioner 1 is in the cooling mode, the four-way valve 34 communicates the first port P1 with the fourth port P4, and communicates the second port P2 with the third port P3, so as to communicate the D pipe with the C pipe and communicate the E pipe with the S pipe. When the air conditioner 1 is in the heating mode, the four-way valve 34 is controlled to communicate the third port P3 with the first port P1, and to communicate the second port P2 with the fourth port P4, thereby communicating the D pipe with the E pipe, and communicating the C pipe with the S pipe.

The outdoor unit controller 35 is coupled to the outdoor fan 32, the compressor 33, the four-way valve 34, the electronic expansion valve 37, etc., and is configured to control the outdoor fan 32, the compressor 33, the four-way valve 34, the electronic expansion valve 37, etc. For example, the outdoor unit controller 35 controls states of the outdoor fan 32 and the compressor 33 to switch between the operating state and the shutdown state; for example, the outdoor unit controller 35 controls operating frequencies of the outdoor fan 32 and the compressor 33; for example, the outdoor unit controller 35 controls reversing of the four-way valve 34; for example, the outdoor unit controller 35 controls an opening degree of the electronic expansion valve 37. An implementation of the outdoor unit controller 35 may be achieved with reference to that of the indoor unit controller 23. In addition, the outdoor unit controller 35 and the indoor unit controller 23 are configured to be connected to each other by a signal line and can transmit or receive signals to or from each other.

The electronic expansion valve 37 is connected between the outdoor heat exchanger 31 and the indoor heat exchanger 21 and has a function of expanding and decompressing the refrigerant flowing between the outdoor heat exchanger 31 and the indoor heat exchanger 21. The electronic expansion valve 37 is configured in a way that the opening degree thereof can be adjusted. By decreasing the opening degree, a flow path resistance of the refrigerant passing through the electronic expansion valve 37 is increased; by increasing the opening degree, the flow path resistance of the refrigerant passing through the electronic expansion valve 37 is decreased. Thus, the pressure of the refrigerant flowing through the outdoor heat exchanger 31 and the indoor heat exchanger 21 can be adjusted by adjusting the opening degree of the electronic expansion valve 37, so as to adjust a flow rate of the refrigerant flowing between the outdoor heat exchanger 31 and the indoor heat exchanger 21. The flow rate and the pressure of the refrigerant flowing between the outdoor heat exchanger 31 and the indoor heat exchanger 21 will affect a heat exchange performance of the outdoor heat exchanger 31 and the indoor heat exchanger 21.

The compressor 33, the four-way valve 34, the outdoor heat exchanger 31, the electronic expansion valve 37, the indoor heat exchanger 21, the four-way valve 34, and the compressor 33 are connected in sequence through pipes (indicated by bold connection lines in FIG. 1) to form a refrigerant circulation loop. The refrigerant circulation loop is configured to circulate the refrigerant to realize heat exchange, so as to achieve the purpose of cooling or heating.

A process in which the refrigerant exchanges heat in the refrigerant circulation loop shown in FIG. 1 will be described below with reference to FIG. 2.

Figure 2:
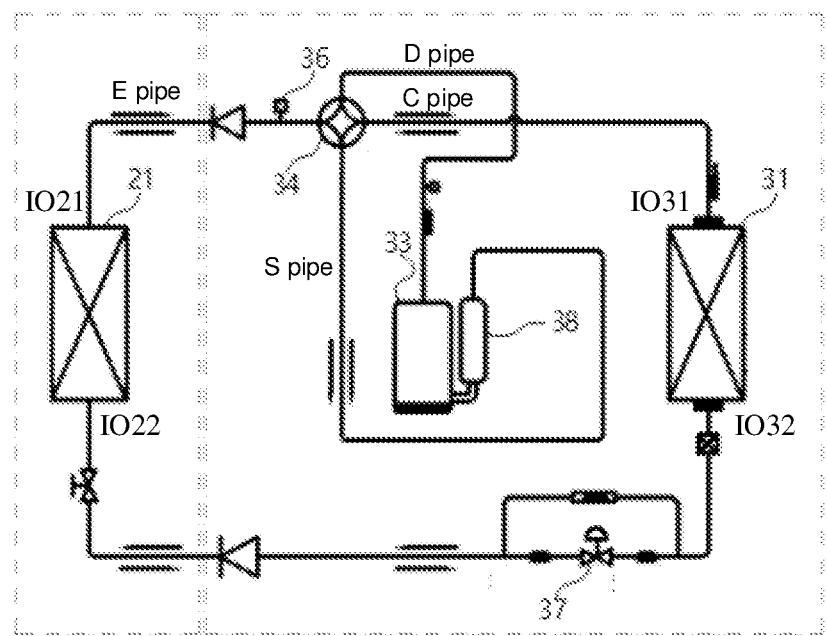
FIG. 2 is a schematic diagram showing a refrigerant circulation loop of an air conditioner according to some embodiments.

FIG. 2 is a schematic diagram showing a refrigerant circulation loop of an air conditioner according to some embodiments. As shown in FIG. 2, the refrigerant circulation loop includes the compressor 33, the outdoor heat exchanger 31, the indoor heat exchanger 21, the electronic expansion valve 37, and the four-way valve 34. In addition, the refrigerant circulation loop may further include a gas-liquid separator 38 for separating gas-liquid two-phase refrigerant. Liquid-phase refrigerant in the gas-liquid two-phase refrigerant is stored in the gas-liquid separator 38, and gas-phase refrigerant in the gas-liquid two-phase refrigerant is sucked into the compressor 33.

A cycle process of refrigerant includes a series of processes involving compression, condensation, expansion, and evaporation. Hereinafter, cycle processes of the refrigerant will be described separately when the air conditioner 1 works in the cooling mode and in the heating mode.

The description will be given by taking an example in which the air conditioner 1 works in the cooling mode. It will be noted that, in the cooling mode, the outdoor heat exchanger 31 serves as a condenser, and the indoor heat exchanger 21 serves as an evaporator.

The compressor 33 sucks gaseous refrigerant from a suction port, compresses the gaseous refrigerant into high-temperature and high-pressure gaseous refrigerant, and then discharges the gaseous refrigerant through a discharge port.

The four-way valve 34 communicates the D pipe with the C pipe, and the E pipe with the S pipe. In this case, the high-temperature and high-pressure superheated gaseous refrigerant discharged from the compressor 33 enters the outdoor heat exchanger 31 through a first in-and-out port IO31 of the outdoor heat exchanger 31.

The outdoor heat exchanger 31, serving as a condenser, performs heat exchange between the superheated gaseous refrigerant flowing in the heat transfer pipe thereof and the outdoor air, thereby condensing the superheated gaseous refrigerant. The superheated gaseous refrigerant is condensed through the outdoor heat exchanger 31 and then liquefied to release heat to the outdoor air to form a supercooled liquid refrigerant. The supercooled liquid refrigerant is discharged through a second in-and-out port IO32 of the outdoor heat exchanger 31 and then sent to the electronic expansion valve 37.

After the supercooled liquid refrigerant is expanded through the electronic expansion valve 37, a gas-liquid two-phase refrigerant with low temperature and low pressure is formed. The gas-liquid two-phase refrigerant with low temperature and low pressure enters the indoor heat exchanger 21 through a second in-and-out port IO22 of the indoor heat exchanger 21.

The indoor heat exchanger 21, serving as an evaporator, performs heat exchange between the gas-liquid two-phase refrigerant with low temperature and low pressure flowing in the heat transfer pipe thereof and the indoor air, thereby evaporating the gas-liquid two-phase refrigerant with low temperature and low pressure. The gas-liquid two-phase refrigerant with low temperature and low pressure is evaporated through the indoor heat exchanger 21 and then vaporized to absorb heat, thereby taking away the heat of the indoor air to form a gaseous refrigerant. Since the four-way valve 34 communicates the E pipe with the S pipe, the gaseous refrigerant will return to the gas-liquid separator 38 after being discharged through a first in-and-out port IO21 of the indoor heat exchanger 21, and then enters a next refrigeration cycle.

It will be seen that, in the cooling mode, the air conditioner 1 can use the refrigerant, which absorbs heat when being evaporated, to exchange heat with indoor air to be cooled, thereby reducing the temperature of the indoor space where the indoor heat exchanger 21 is located to achieve the purpose of cooling. It will be noted that the "high temperature and high pressure" and "low temperature and low pressure", and "superheated" and "supercooled" are all relative concepts and should not be interpreted as limitations on numerical values of the temperature and pressure of the refrigerant.

The description will be given by taking an example in which the air conditioner 1 works in the heating mode. It will be noted that, functions of the indoor heat exchanger 21 and the outdoor heat exchanger 31 in the heating mode are opposite to those of the indoor heat exchanger 21 and the outdoor heat exchanger 31 in the cooling mode, that is, in the heating mode, the indoor heat exchanger 21 serves as a condenser, and the outdoor heat exchanger 31 serves as an evaporator.

In the heating mode, the four-way valve 34 communicates the D pipe with the E pipe, and communicates the C pipe with the S pipe, so that a flow direction of the refrigerant in the indoor heat exchanger 21 and the outdoor heat exchanger 31 is opposite to the flow direction of the refrigerant in the indoor heat exchanger 21 and the outdoor heat exchanger 31 in the cooling mode. In this way, the air conditioner 1 can use the refrigerant, which releases heat when being condensed, to exchange heat with indoor air to be heated, thereby increasing the temperature of the indoor space where the indoor heat exchanger 21 is located to achieve the purpose of heating. A cycle process of the refrigerant in the heating mode will not be repeated herein, but can be understood adaptively with reference to the cycle process of the refrigerant in the cooling mode.

The foregoing contents have described in detail the process of heat exchange of the refrigerant in the refrigerant circulation loop shown in FIG. 1 with reference to FIG. 2. It will be noted that, unless otherwise indicated, an operational process of the air conditioner 1 will be described in detail by taking the air conditioner 1 working in the cooling mode as an example below.

With continued reference to FIG. 1, the indoor unit controller 23 is configured to communicate with the outdoor unit controller 35 via a switching signal.

For example, the indoor unit controller 23 is configured to control output of the switching signal, and the switching signal is used to instruct the outdoor unit 3 to operate or shut down. The outdoor unit controller 35 is configured to control reception of the switching signal, and to control switching of states of the compressor 33 and the outdoor fan 32 according to the switching signal.

It will be noted that the switching signal may be a power-on signal or a power-off signal. When the switching signal is a power-on signal, it is used to instruct the outdoor unit 3 to operate. When the switching signal is a power-off signal, it is used to instruct the outdoor unit 3 to shut down. It will be noted that the switching signal consists of a high-level signal and a low-level signal. For example, a switching signal of 24V includes a high-level signal of 24V or close to 24V, and a low-level signal of 0V or close to 0V. The high-level signal may be used as a power-on signal and is configured to instruct the outdoor unit 3 to operate. The low-level signal can be used as a power-off signal and is configured to instruct the outdoor unit 3 to shut down. Of course, in other embodiments, a high-level signal may also be used as a power-off signal, and a low-level signal may also be used as a power-on signal, which is not limited in the embodiments of the present disclosure. It will be noted that the "high-level" and "low-level" are relative concepts and should not be interpreted as a limitation on a numerical value of a level.

In the related art, by taking an example in which the air conditioner 1 works in the cooling mode, the air conditioner 1 enters a power-on state in response to a power-on instruction initiated by the user to the air conditioner 1 through a remote controller, an APP, etc. In the power-on state, the air conditioner 1 responds to the setting instruction initiated by the user to the air conditioner 1 through a remote control, an APP, etc., and operates based on setting parameters (e.g., an operating mode, a setting temperature, etc.) indicated by the setting instruction.

In response to a power-off instruction initiated by the user to the air conditioner 1 through a remote control, an APP, etc., or a power failure of the air conditioner 1, the air conditioner 1 enters a power-off state, and it is no longer necessary to adjust an indoor temperature. Therefore, in the power-off state, the indoor unit controller 23 controls the indoor fan 22 to be in a shutdown state and sends a power-off signal configured to instruct the outdoor unit 3 to stop operating, so that the outdoor unit 3 stops providing cooling capacity. After receiving the power-off signal, the outdoor unit controller 35 controls the compressor 33 and the outdoor fan 32 to shut down, thereby stopping operation of the outdoor unit 3, and stopping the outdoor unit 3 from providing cooling capacity to the indoor unit 2.

During the operation of the air conditioner 1, when the indoor temperature does not reach the setting temperature, the outdoor unit 3 is required to provide sufficient cooling capacity to perform temperature control, and the air conditioner 1 enters a temperature control state. When the air conditioner 1 is in the temperature control state, the indoor unit controller 23 controls the indoor fan 22 to be in the operating state and sends a power-on signal configured to instruct the outdoor unit 3 to operate, so that the outdoor unit 3 provides sufficient cooling capacity. After receiving the power-on signal, the outdoor unit controller 35 controls the compressor 33 and the outdoor fan 32 to operate at a high constant frequency according to the power-on signal, so as to rapidly provide sufficient cooling capacity to rapidly reduce the indoor temperature to the setting temperature.

When the indoor temperature reaches the setting temperature, the cooling capacity is no longer required for temperature control, and the air conditioner 1 enters a temperature-controlled shutdown state. When the air conditioner 1 is in the temperature-controlled shutdown state, the indoor unit controller 23 continues to control the indoor fan 22 to be in the operating state and sends a power-off signal configured to instruct the outdoor unit 3 to stop operating, so that the outdoor unit 3 stops providing cooling capacity. After receiving the power-off signal, the outdoor unit controller 35 controls the compressor 33 and the outdoor fan 32 to shut down, thereby stopping operation of the outdoor unit 3, and stopping the outdoor unit 3 from providing cooling capacity to the indoor unit 2.

It will be understood that when the air conditioner 1 is in the temperature-controlled shutdown state, the indoor temperature will gradually rise as the supply of the cooling capacity is stopped, and thus the setting temperature is not satisfied. In this case, the air conditioner 1 exits the temperature-controlled shutdown state and enters the temperature control state again, and the indoor unit controller 23 will re-send a power-on signal to the outdoor unit controller 35, so as to instruct the outdoor unit controller 35 to control the outdoor unit 3 to be turned on again and to operate at a high constant frequency. In this way, the outdoor unit 3 will be frequently started and stopped.

It will be noted that, since the outdoor unit 3 operates at a high constant frequency and the outdoor unit 3 is frequently started and stopped, power consumption of the air conditioner 1 will be relatively large. In addition, frequent startup and shutdown of the outdoor unit 3 will also cause the indoor room temperature to fluctuate greatly, thereby affecting comfortableness of users.

In order to solve the above problems of large power consumption and large fluctuation of room temperature, some embodiments of the present disclosure provide an outdoor unit 3, and the outdoor unit 3 can be applied to the air conditioner 1 shown in FIG. 1. On a premise that the outdoor unit 3 does not change the communication means (i.e., the outdoor unit 3 continues to use the switching signal as the communication means), the outdoor unit 3 switches to a low frequency and continues to operate at the low frequency when the air conditioner 1 switches from the temperature control state to the temperature-controlled shutdown state. In this way, a variable-frequency operation is realized, thereby solving the above problems.

It will be understood that, since the switching signal employed for constant-frequency operation is still used, the outdoor unit 3 provided by some embodiments of the present disclosure cannot obtain operating parameters of the indoor unit 2 required for variable-frequency operation based on the switching signal. In a case where a communication means of constant frequency in which the operating parameters of the indoor unit 2 cannot be known is used in some embodiments of the present disclosure, the state of the air conditioner 1 can still be identified and the air conditioner 1 performs variable-frequency operation when entering the temperature-controlled shutdown state, which is an important contribution of some embodiments of the present disclosure. The outdoor unit 3 provided by some embodiments of the present disclosure will be described in detail below with reference to FIGS. 1 to 6.

With continued reference to FIG. 1, in the outdoor unit 3, the outdoor unit controller 35 is configured to: receive a switching signal; control the compressor 33 and the outdoor fan 32 to operate in a case where the switching signal instructs the outdoor unit 3 to operate (i.e., the switching signal is a power-on signal), and an operating frequency of the compressor 33 being a first frequency; acquire a current state of the indoor fan 22 in a case where the switching signal instructs the outdoor unit 3 to shut down (i.e., the switching signal is a power-off signal), the current state of the indoor fan 22 being one of an operating state and a shutdown state; control the compressor 33 and the outdoor fan 32 to be in the operating state if the current state of the indoor fan 22 is the operating state, and the operating frequency of the compressor 33 being a second frequency (e.g., 50 Hz) lower than the first frequency (e.g., 80 Hz); and control the compressor 33 and the outdoor fan 32 to be in the shutdown state if the current state of the indoor fan 22 is the shutdown state.

It will be seen from the foregoing contents that the indoor unit controller 23 controls the indoor fan 22 to be in the operating state in a case where the air conditioner 1 is in the temperature control state and the air conditioner 1 is in the temperature-controlled shutdown state and controls the indoor fan 22 to be in the shutdown state in a case where the air conditioner 1 is in the power-off state. In addition, in a case where the air conditioner 1 is in the temperature control state, the indoor unit controller 23 controls output of the switching signal for instructing the outdoor unit 3 to operate, and in a case where the air conditioner 1 is in the temperature-controlled shutdown state and the air conditioner 1 is in the power-off state, the indoor unit controller 23 controls output of the switching signal for instructing the outdoor unit 3 to operate.

It will be seen that the expression that "the switching signal instructs the outdoor unit 3 to operate" can represent that "the air conditioner 1 is in the temperature control state," in a case where the switching signal instructs the outdoor unit 3 to shut down, the expression that "the current state of the indoor fan 22 is the operating state" can represent that "the air conditioner 1 is in the temperature-controlled shutdown state," and in a case where the switching signal instructs the outdoor unit 3 to shut down, the expression that "the current state of the indoor fan 22 is in the shutdown state" can represent that "the air conditioner 1 is in the power-off state."

Based on this, in the outdoor unit 3 shown in FIG. 1, the outdoor unit controller 35 recognizes the state of the air conditioner 1 based on the switching signal in combination with the current state of the indoor fan 22, and the outdoor unit controller 35 controls: the compressor 33 and the outdoor fan 32 to be in the operating state in a case where the air conditioner 1 is in the temperature control state; the compressor 33 and the outdoor fan 32 to continue in the operating state in a case where the air conditioner 1 is in the temperature-controlled shutdown state, and the compressor 33 operating at a low frequency; and the compressor 33 and the outdoor fan 32 to be in the shutdown state in a case where the air conditioner 1 is in the power-off state.

It will be seen that, different from the related art, when the air conditioner 1 enters the temperature-controlled shutdown state, the outdoor unit controller 35 controls the compressor 33 and the outdoor fan 32 to continue to operate in response to the received power-off signal, and the compressor 33 is switched to a low operating frequency to continue to operate, so as to continue to provide cooling capacity.

Compared with the aforementioned related art, in the air conditioner 1 shown in FIG. 1, since the compressor 33 and the outdoor fan 32 are switched to a low frequency to continuously operate instead of being directly shut down when the air conditioner 1 is in the temperature-controlled shutdown state, some cooling capacity can be continuously provided to well stabilize the indoor temperature at the setting temperature. Therefore, a problem is avoided that the indoor temperature is abruptly changed due to direct shutdown of the compressor 33 and the outdoor fan 32, thereby reducing large fluctuation of indoor temperature and improving comfortableness of users. In addition, compared with the outdoor unit 3 in the related art, which operates at a high constant frequency and is frequently started and stopped, the compressor 33 and the outdoor fan 32 are switched to a low frequency to operate continuously, and thus energy saving can be achieved.

Figure 3:
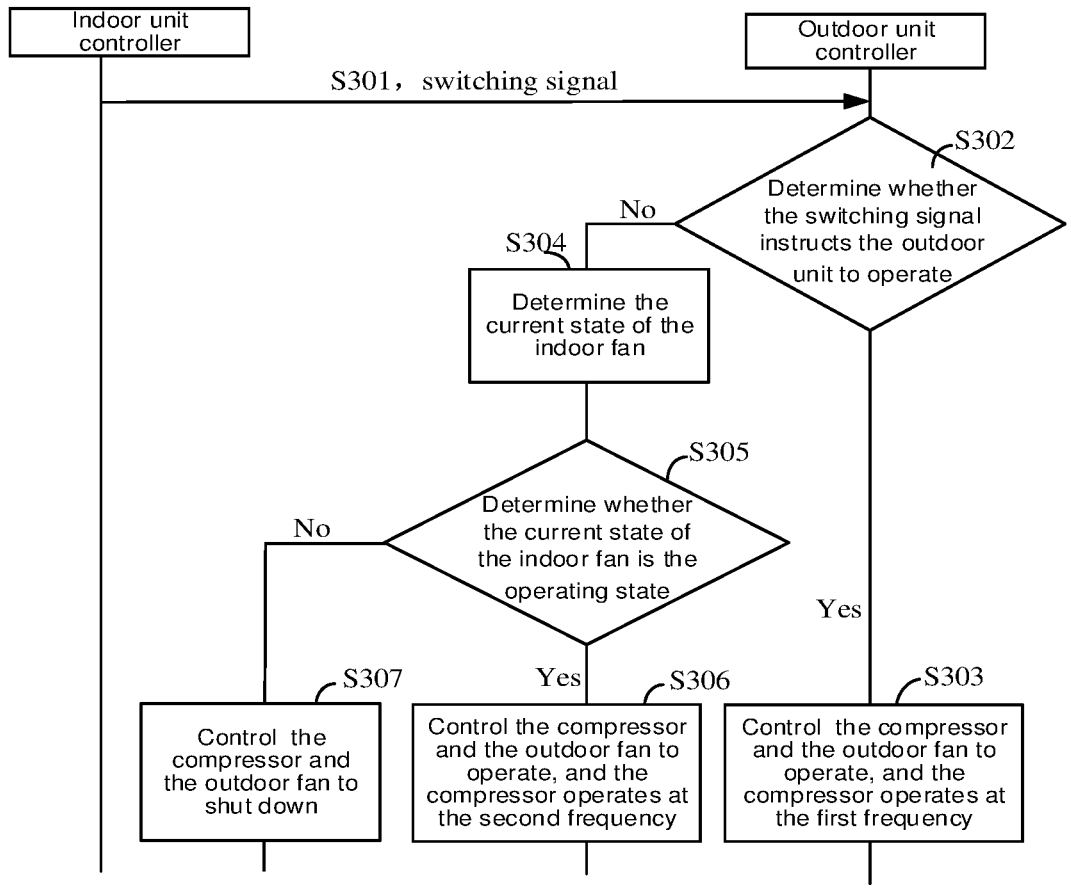
FIG. 3 is an interaction flow diagram of an air conditioner according to some embodiments.

During implementation, the air conditioner 1 may execute an interactive process shown in FIG. 3 to achieve the above functions. Referring to FIG. 3, it is an interaction flow diagram of an air conditioner according to some embodiments. The interaction flow diagram includes the following steps S301 to S307.

In S301, the indoor unit controller 23 sends a switching signal to the outdoor unit controller 35, and the outdoor unit controller 35 receives the switching signal sent from the indoor unit controller 23.

In S302, the outdoor unit controller 35 determines whether the switching signal instructs the outdoor unit 3 to operate.

If yes, S303 is performed, and if no, S304 is performed.

In S303, the outdoor unit controller 35 controls the compressor 33 and the outdoor fan 32 to operate, and the compressor 33 operates at the first frequency.

In S304, the outdoor unit controller 35 determines the current state of the indoor fan 22.

In S305, the outdoor unit controller 35 determines whether the current state of the indoor fan 22 is the operating state.

If yes, S306 is performed, and if no, S307 is performed.

In S306, the outdoor unit controller 35 controls the compressor 33 and the outdoor fan 32 to be in the operating state, and the compressor 33 operates at the second frequency.

In S307, the outdoor unit controller 35 controls the compressor 33 and the outdoor fan 32 to be in the shutdown state.

It will be noted that, in the outdoor unit 3 shown in FIG. 1, the switching signal that cannot carry operating parameters (e.g., the state of the indoor fan 22, etc.) is still used as a communication means. It will be understood that, in a case where the communication means is not changed, the outdoor unit controller 35 cannot obtain the operating parameters of the indoor unit 2, e.g., the current state of the indoor fan 22, based on the switching signal. Therefore, how to obtain the state of the indoor fan 22 is an important improvement of the present disclosure.

In some embodiments of the present disclosure, by detecting an internal pressure of the first pipe M1, the current state of the indoor fan 22 is obtained according to the internal pressure of the first pipe M1. The first pipe M1 is a pipe connecting the indoor heat exchanger 21, and the first pipe M1 is a pipe connected between the compressor 33 and the indoor heat exchanger 21, namely the E-pipe to which the four-way valve 34 is connected.

Based on this, the outdoor unit 3 further includes a pressure sensor 36 configured to detect an internal pressure of the E pipe. For example, the pressure sensor 36 may be provided within the E pipe entirely, or only a probe configured to sense pressure may be provided within the E pipe.

It will be understood that whether the indoor heat exchanger 21 performs heat exchange will have different effects on an internal pressure of a heat transfer pipe thereof. Since the E pipe is connected to the indoor heat exchanger 21, whether the indoor heat exchanger 21 performs heat exchange will also have different effects on the internal pressure of the E pipe. As a result, the internal pressure of the E pipe is changed by different magnitudes. It will be seen that the change in the internal pressure of the E pipe can represent whether the indoor heat exchanger 21 performs heat exchange. It will be noted that, in a case where the indoor fan 22 is in the operating state, the indoor heat exchanger 21 performs heat exchange, and in a case where the indoor fan 22 is in the shutdown state, the indoor heat exchanger 21 will stop heat exchange. Therefore, the change in the internal pressure of the E pipe can further represent the state of the indoor fan 22. Based on this, the current state of the indoor fan 22 can be recognized by detecting the internal pressure of the E pipe and distinguishing the change thereof.

Figure 4:
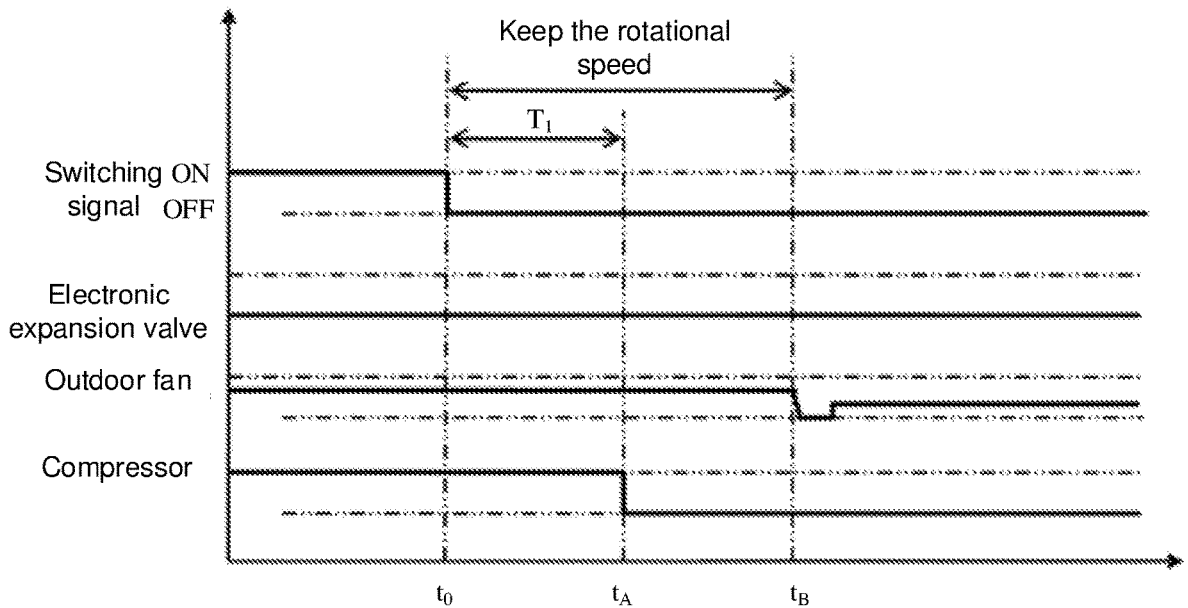
FIG. 4 is a timing diagram of a transition of an air conditioner from a temperature control state to a temperature-controlled shutdown state in a cooling mode according to some embodiments.

For example, referring to FIG. 4, a moment to is a moment when the switching signal is switched from the power-on signal ON to the power-off signal OFF; a period of time $T_1$ from the moment $t_0$ to a moment $t_A$ is a period of time in which the outdoor unit controller 35 obtains the current state of the indoor fan 22; and the moment $t_A$ is a moment when the outdoor unit controller 35 determines that the indoor fan 22 is in the operating state and controls the operating frequency of the compressor 33 to decrease from the first frequency to the second frequency. It will be seen that rotational speeds of the compressor 33 and the outdoor fan 32 are kept constant in the period of time $T_1$. That is to say, after receiving the power-off signal and before determining the current state of the indoor fan 22, no matter whether the indoor fan 22 is in the operating state or the shutdown state, the compressor 33 and the outdoor fan 32 still keep rotating at the first frequency, so that substantially constant cooling capacity is provided to the indoor unit 2.

In this case, if the indoor fan 22 is still in the operating state after the moment to, the indoor heat exchanger 21 will continue to exchange heat after the moment to. In this way, before and after the moment to, states of the indoor heat exchanger 21 are the same, and the indoor heat exchanger 21 continuously uses the outdoor unit 3 to provide substantially constant cooling capacity for cooling. Thus, the indoor temperature will not rise sharply, and the change in the internal pressure of the E pipe is small. If the indoor fan 22 is in the shutdown state after the to moment, the indoor heat exchanger 21 stops heat exchange after the to moment. In this way, before and after the moment to, states of the indoor heat exchanger 21 are completely opposite, and the indoor heat exchanger 21 no longer uses the outdoor unit 3 to provide substantially constant cooling capacity for cooling. Thus, the indoor temperature will rise sharply, and the change in the internal pressure of the E pipe is large.

Therefore, the current state of the indoor fan 22 can be obtained by determining whether a change value of the internal pressure of the first pipe exceeds a preset change threshold.

Figure 5:
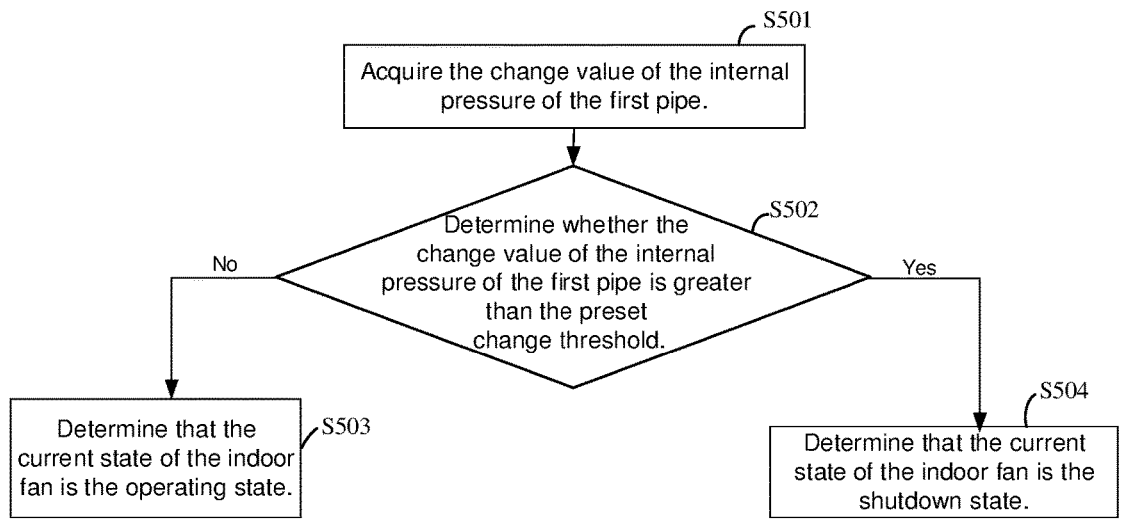
FIG. 5 is a schematic flowchart of determining a current state of an indoor fan according to some embodiments.

Based on this, in some embodiments, referring to FIG. 5, the above step 304 of determining the current state of the indoor fan 22 can execute through the following steps 501 to 504.

In S501, the outdoor unit controller 35 acquires the change value of the internal pressure of the first pipe.

The change value of the internal pressure of the first pipe is a difference between an internal pressure of the first pipe at a second moment (e.g., a moment $t_2$) and an internal pressure of the first pipe at a first moment (e.g., a moment $t_1$); the second moment is later than the first moment and a critical moment; and the critical moment is a moment when the outdoor unit controller 35 receives the power-off signal (e.g., the moment to).

For example, the pressure sensor 36 is coupled to the outdoor unit controller 35. The pressure sensor 36 is configured to detect the internal pressure of the first pipe and report it to the outdoor unit controller 35. The outdoor unit controller 35 performs the above S501. For example, the pressure sensor 36 may periodically detect the internal pressure of the first pipe and report it to the outdoor unit controller 35.

In S502, the outdoor unit controller 35 determines whether the change value of the internal pressure of the first pipe is greater than the preset change threshold.

If no, S503 is performed; and if yes, S504 is performed.

In S503, the outdoor unit controller 35 determines that the current state of the indoor fan 22 is the operating state.

In S504, the outdoor unit controller 35 determines that the current state of the indoor fan 22 is the shutdown state.

FIG. 5 illustrates a process of obtaining the current state of the indoor fan 22 by taking an example in which the outdoor unit controller 35 performs the above S501 to S504. It will be understood that, in other embodiments, the above S501 to S504 may also be performed by the pressure sensor 36, and then the pressure sensor 36 reports the obtained current state of the indoor fan 22 to the outdoor unit controller 35, which is not limited by the present disclosure.

It will be seen from the foregoing contents that, in a case where the switching signal instructs the outdoor unit 3 to shut down, whether the current state of the indoor fan 22 is the operating state can be used to distinguish the temperature-controlled shutdown state from the power-off state. In some embodiments, that the second moment is later than the critical moment represents that the internal pressure of the first pipe at the second moment is collected after the outdoor unit controller 35 receives the power-off signal. In this way, the current state of the indoor fan 22, which is obtained based on the internal pressure of the first pipe at the second moment, is of course obtained in a case where the switching signal instructs the outdoor unit 3 to shut down, and thus it can be used to distinguish the temperature-controlled shutdown state from the power-off state.

In the above S501, the first moment may be earlier than the critical moment (e.g., the moment $t_1$ is earlier than the to moment), or may be at the critical moment (e.g., the $t_1$ moment is the $t_0$ moment), or may be later than the critical moment (e.g., the $t_1$ moment is later than the $t_0$ moment). The first moment is not limited in the present disclosure. That is to say, collection of the internal pressure of the first pipe at the second moment and acquisition of the change value of the internal pressure of the first pipe (i.e., the S501) are performed after receiving the power-off signal (e.g., after the moment $t_0$). However, acquisition of the internal pressure of the first pipe at the first moment is not necessarily performed after receiving the power-off signal but may also be performed when or before the power-off signal is received.

In a first example, the pressure sensor 36 may start a periodic collection of the internal pressure of the first pipe after the outdoor unit controller 35 receives the power-off signal. In this way, the obtained internal pressures of the first pipe are all collected at a moment later than the critical moment. In this case, the first moment and the second moment are both later than the critical moment, which is illustrated in FIG. 4.

In a second example, the pressure sensor 36 may also start the periodic collection of the internal pressure of the first pipe after the outdoor unit controller 35 receives the power-on signal, that is, the collection of the internal pressure of the first pipe is started after the air conditioner 1 is started. In this way, the obtained internal pressure of the first pipe is not necessarily collected at a moment later than the critical moment. In this case, those internal pressures of the first pipe collected not later than the critical moment can be used as the internal pressures of the first pipe at the first moment, and those internal pressures of the first pipe collected later than the critical moment are the internal pressures of the first pipe at the second moment. That is, the first moment is not later than the critical moment, and the second moment is later than the critical moment.

It will be understood that since a condition that the second moment is later than the critical moment is needed to be satisfied, the second example will collect a lot of invalid data. Therefore, in order to avoid invalid data collection, the first example can be used for implementation.

The above preset change threshold may be set according to different actual conditions of the air conditioner 1, which is not limited herein. For implementation, during a testing process, the preset change threshold may be set as the change value of the internal pressure of the first pipe corresponding to the same duration. For example, a moment when the outdoor unit controller 35 receives the power-off signal during the testing process is a moment $t_0'$, and the preset change threshold may be set as a difference between an internal pressure of the first pipe at a moment $t_4$ and an internal pressure of the first pipe at a moment $t_3$, where a duration from the moment $t_3$ to the moment $t_4$ is equal to a duration from the moment $t_1$ to the moment $t_2$.

During the testing process, the preset change threshold may also be set as the change value of the internal pressure of the first pipe corresponding to the same period of time. For example, the preset change threshold may be set as a difference between an internal pressure of the first pipe at a moment $t_2'$ and an internal pressure of the first pipe at a moment $t_1'$, where a duration from the moment $t_1'$ to the moment $t_0'$ is equal to a duration from the moment $t_1$ to the moment $t_0$, and a duration from the moment $t_2'$ to the moment $t_0'$ is equal to a duration from the moment $t_2$ to the moment $t_0$.

A duration from the first moment to the second moment is not limited in the present disclosure. It will be known from the foregoing contents that when the indoor fan 22 is in the shutdown state, the change in an internal pressure of the E pipe is large. It will be understood that if the indoor fan 22 is in the shutdown state, the shorter the duration from the first moment to the second moment is, the smaller the change in the internal pressure of the E pipe is, and the easier it is to misjudge the current state of the indoor fan 22 as the operating state. Therefore, the duration from the first moment to the second moment is longer than 1 s to prevent the duration from the first moment to the second moment from being too short. For example, the duration from the first moment to the second moment may be 10 s.

It will be understood that the higher the operating frequency of the compressor 33 is, the greater the cooling capacity or the heating capacity is; and the lower the operating frequency of the compressor 33 is, the smaller the cooling capacity or the heating capacity is. After the air conditioner 1 enters the temperature-controlled shutdown state, if the room load (i.e., the cooling capacity or the heating capacity required by the air conditioner 1 to stabilize the indoor temperature at the setting temperature) is not matched with the cooling capacity or the heating capacity provided by the compressor 33, it is difficult to stabilize the indoor temperature at the setting temperature. In order to well stabilize the indoor temperature at the setting temperature, the operating frequency of the compressor 33 is in a positive correlation with the room load.

It will be noted that, for the air conditioner 1 using the switching signal as the communication means in FIG. 1, the outdoor unit controller 35 cannot know the room load. However, since the internal pressure of the first pipe is related to the indoor temperature, and the indoor temperature is in turn related to the room load, the internal pressure of the first pipe is related to the room load and can be used to represent the room load. For example, when the air conditioner 1 is in the heating mode, the internal pressure of the first pipe is in a negative correlation with the room load, and when the air conditioner 1 is in the cooling mode, the internal pressure of the first pipe is in a positive correlation with the room load.

Based on this, in some embodiments, in order to reasonably adjust the operating frequency of the compressor 33 to well stabilize the indoor temperature at the setting temperature, when the air conditioner 1 is in the heating mode, the second frequency is in a negative correlation with the internal pressure of the first pipe, and when the air conditioner 1 is in the cooling mode, the second frequency is in a positive correlation with the internal pressure of the first pipe.

That is, when the air conditioner 1 is in the heating mode, the smaller the internal pressure of the first pipe is, the higher the second frequency is; and the greater the internal pressure of the first pipe is, the lower the second frequency is. It will be understood that when the air conditioner 1 is in the heating mode, the internal pressure of the first pipe is in a negative correlation with the room load, that is, the larger the room load is, the smaller the internal pressure of the first pipe is, and the smaller the room load is, the greater the internal pressure of the first pipe is. It will be seen that when the air conditioner 1 is in the heating mode, the larger the room load is, the higher the second frequency is, and the more the heating capacity provided by the compressor 33 is, so that a high demand of the large room load on the heating capacity may be satisfied; and the smaller the room load is, the greater the internal pressure of the first pipe is, the lower the second frequency is, and the less the heating capacity provided by the compressor 33 is, so that a low demand of the small room load on the heating capacity may be satisfied.

When the air conditioner 1 is in the cooling mode, the greater the internal pressure of the first pipe is, the higher the second frequency is; and the smaller the internal pressure of the first pipe is, the lower the second frequency is. It will be understood that when the air conditioner 1 is in the cooling mode, the internal pressure of the first pipe is in a positive correlation with the room load. That is, the larger the room load is, the greater the internal pressure of the first pipe is, and the smaller the room load is, the smaller the internal pressure of the first pipe is. It will be seen that, when the air conditioner 1 is in the cooling mode, the larger the room load is, the higher the second frequency is, and the more the cooling capacity provided by the compressor 33 is, so that a high demand of the large room load on the cooling capacity may be satisfied; and the smaller the room load is, the lower the second frequency is, and the less the cooling capacity provided by the compressor 33 is, so that a low demand of the small room load on the cooling capacity may be satisfied.

It will be seen that, in a case where the switching signal instructs the outdoor fan 32 to stop operating and the indoor fan 22 is in the operating state (i.e., in the temperature-controlled shutdown state), the outdoor unit controller 35 controls the compressor 33 to operate at an operating frequency that changes with the change in the internal pressure of the first pipe. That is to say, in some embodiments, the air conditioner 1 not only realizes variable-frequency operation by switching frequency when the air conditioner 1 is switched from the temperature control state to the temperature-controlled shutdown state, but also performs the variable-frequency operation during a whole process in which the air conditioner 1 is in the temperature-controlled shutdown state. The compressor 33 operating at variable frequency is obviously more energy efficient than the compressor 33 operating at constant frequency in the related art.

During implementation, in some examples, the positive correlation or the negative correlation between the second frequency and the internal pressure of the first pipe may be stored in the form of a preset corresponding relationship; and the preset corresponding relationship includes a plurality of sets of corresponding relationships, and a set of corresponding relationship includes an internal pressure of a first pipe and a corresponding second frequency. The outdoor unit controller 35 may query a second frequency corresponding to a current internal pressure of the first pipe in the preset corresponding relationship based on the current internal pressure of the first pipe and use the second frequency as the operating frequency of the compressor 33. It will be noted that the current internal pressure of the first pipe is one of internal pressures of a plurality of first pipes in the plurality of sets of corresponding relationships.

In some other examples, the outdoor unit 3 stores a plurality of sets of preset pressure corresponding relationships. Each set of preset pressure corresponding relationship includes a preset pressure and a critical pressure. The critical pressure refers to the internal pressure of the first pipe detected by the pressure sensor 36 at the critical moment (i.e., the moment to). The preset pressure is greater than the critical pressure. A value of the preset pressure is not limited in the present disclosure.

Based on a current critical pressure, the outdoor unit controller 35 queries the plurality of sets of preset pressure corresponding relationships to obtain a preset pressure corresponding to the current critical pressure (hereinafter referred to as the current preset pressure). The current critical pressure is one of the critical pressures included in the plurality of sets of preset pressure corresponding relationships. The outdoor unit controller 35 acquires the internal pressure of the first pipe in real time, and then uses a difference between the current preset pressure and the internal pressure of the first pipe acquired in real time as a control target and performs negative feedback control on the second frequency of the compressor through an algorithm such as mode control. As the negative feedback control process is performed, the internal pressure of the first pipe continuously approaches the current preset pressure. For example, when the air conditioner 1 is in the heating mode, the internal pressure of the first pipe continuously rises and approaches the current preset pressure, and when the air conditioner 1 is in the cooling mode, the internal pressure of the first pipe continuously reduces and approaches the current preset pressure. In this way, the control target will decrease as the negative feedback control process is performed, and the second frequency of the compressor 33 will decrease continuously with the decrease of the control target. A result obtained by performing the above process is: when the air conditioner 1 is in the heating mode, the second frequency of the compressor 33 decreases with the rise of the internal pressure of the first pipe, that is, the second frequency of the compressor 33 is in a negative correlation with the internal pressure of the first pipe; and when the air conditioner 1 is in the cooling mode, the second frequency of the compressor 33 decreases with the decrease of the internal pressure of the first pipe, that is, the second frequency of the compressor 33 is in a positive correlation with the internal pressure of the first pipe.

During implementation, the preset pressure corresponding to the critical pressure can be obtained by testing according to an actual condition of the air conditioner 1. During the testing process, for the same critical pressure, different preset pressures are set, and the compressor 33 is controlled to operate at a second frequency (e.g., 20 Hz to 50 Hz) lower than the first frequency, and finally the preset pressure is selected by taking whether the indoor temperature can be well stabilized at the setting temperature as an evaluation index.

It will be noted that the second frequency may generally be controlled between 25 Hz and 50 Hz, but of course, it may also be beyond this range in special circumstances (when the room load is very large). In some other embodiments, the second frequency may also be a low constant frequency, e.g., 30 Hz.

In some embodiments, in a case where the outdoor unit controller 35 receives the power-off signal and the indoor fan 22 is in the operating state (i.e., the air conditioner is in the temperature-controlled shutdown state), the second frequency of the compressor 33 is adjusted in real time according to the internal pressure of the first pipe. That is, it is equivalent to adjusting the second frequency of the compressor 33 in real time according to the room load, thereby achieving variable-frequency control. In this way, it is possible to match the cooling capacity provided by the compressor 33 with the room load, and it is possible to avoid problems of energy consumption and inability to maintain the set temperature due to an unreasonable second frequency.

Figure 6:
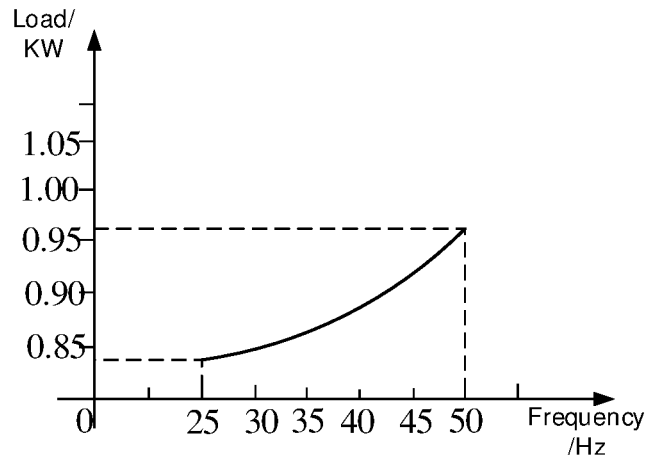
FIG. 6 is a graph showing a function between a room load and a second frequency according to some embodiments.

In some other embodiments, the second frequency is in a positive correlation with the room load. For example, a graph showing a function between the room load and the second frequency according to some embodiments is shown in FIG. 6.

During implementation, the positive correlation between the room load and the second frequency may be stored in a manner similar to the above preset corresponding relationship. The outdoor unit controller 35 may determine a second frequency corresponding to a current room load based on the current room load and the preset corresponding relationship between the room load and the second frequency and use the second frequency as the operating frequency of the compressor 33.

It will be noted that, by obtaining current output capacity (cooling capacity) of the compressor 33, the current room load can be calculated according to the current output capacity of the compressor 33. In some embodiments, in a case where the switching signal instructs the outdoor unit 3 to operate (i.e., the air conditioner 1 is in the temperature control state), an operating frequency of the outdoor fan 32 is a third frequency; in a case where the switching signal instructs the outdoor unit 3 to stop operating and the current state of the indoor fan 22 is the operating state (i.e., the air conditioner 1 is in the temperature-controlled shutdown state), an operating frequency of the outdoor fan 32 is a fourth frequency; and the fourth frequency is less than or equal to the third frequency. It will be understood that the operating frequency of the outdoor fan 32 refers to a rotational speed of the outdoor fan 32.

It will be seen that, when the air conditioner 1 enters the temperature-controlled shutdown state, energy consumption of the air conditioner 1 in the temperature-controlled shutdown state is further reduced by reducing the operating frequency of the outdoor fan 32, so as to achieve the purpose of energy saving.

During implementation, referring to FIG. 4 again, a moment $t_B$ is a moment when the operating frequency of the outdoor fan 32 starts to reduce from the third frequency to the fourth frequency. It will be seen that reduction of the operating frequency of the outdoor fan 32 occurs after a moment $t_A$, and in this way, a problem of instability of the air conditioner 1 due to simultaneous reduction of operating frequencies of the compressor 33 and the outdoor fan 32 may be avoided.

Of course, in other embodiments, the moment when the operating frequency of the outdoor fan 32 is reduced from the third frequency to the fourth frequency may also be the same moment as a moment when the operating frequency of the compressor 33 is reduced from the first frequency to the second frequency.

In some embodiments, the fourth frequency is in a positive correlation with the second frequency. During implementation, the positive correlation between the fourth frequency and the second frequency may be stored with reference to the above preset corresponding relationship, which will not be repeated herein.

It will be understood that, refrigeration is taken as an example, the higher the operating frequency of the compressor 33 is, the higher the demand on heat dissipation capacity of the outdoor fan 32 is, and the lower the operating frequency of the compressor 33 is, the lower the demand on the heat dissipation capacity of the outdoor fan 32 is. Therefore, in some embodiments, the outdoor unit controller 35 controls the outdoor fan 32 to operate at the fourth frequency that is in a positive correlation with the second frequency, so that the operating frequency of the outdoor fan 32 can be matched with the operating frequency of the compressor 33, thereby avoiding problems of high energy consumption and machine loss due to improper heat dissipation capacity of the outdoor fan 32.

It will be known from the foregoing contents that the second frequency may be a variable value. Therefore, in some embodiments, the fourth frequency that is in a positive correlation with the second frequency is also a variable value. Of course, in some other embodiments, the fourth frequency may be a constant frequency lower than the third frequency.

In some embodiments, referring to FIG. 1 again, an electronic expansion valve 37 is provided in the outdoor unit 3. The electronic expansion valve 37 is configured to communicate the fifth pipe M5 with the sixth pipe M6. The fifth pipe M5 connects the outdoor heat exchanger 31, and the sixth pipe M6 connects the indoor heat exchanger 21.

The electronic expansion valve 37 is coupled to the outdoor unit controller 35, and the outdoor unit controller 35 is further configured to: acquire a current working mode of the air conditioner 1; and control an opening degree of the electronic expansion valve 37 according to an exhaust superheat degree in a case where the current working mode of the air conditioner 1 is the heating mode, the exhaust superheat degree being a difference between an exhaust temperature of the compressor 33 and a saturation temperature corresponding to the internal pressure of the first pipe.

First, an implementation of how to obtain the current working mode of the air conditioner 1 will be described.

It will be understood that, for the air conditioner 1 using the switching signal as the communication means, the outdoor unit controller 35 cannot know the current working mode of the air conditioner 1 through the switching signal. Therefore, how to know the current working mode of the air conditioner 1 is an important improvement of some embodiments of the present disclosure. In some embodiments, the current working mode of the air conditioner 1 is obtained according to reception information, and the reception information is used for indicating a transmission line of the power-on signal.

For example, the transmission lines used for signal transmission between the outdoor unit controller 35 and the indoor unit controller 23 generally include four transmission lines N, B, Y and W. The N line is a naught line and is not used for signal transmission; the B line, the Y line and the W line are all used for transmitting switching signals. The switching signal of 24V is taken as an example, the B line, the Y line, and the W line can transmit a high-level signal of 24V (i.e., the power-on signal) when the air conditioner 1 is in the temperature control state, or transmit a low-level signal of 0V (i.e., the power-off signal) when the air conditioner 1 is in the temperature-controlled shutdown state. If the high-level signal of 24V comes from the B line, it represents that the air conditioner 1 is in the cooling mode; if the high-level signal of 24V comes from both the B line and the Y line, it represents that the air conditioner 1 is in the heating mode; and if the high-level signal of 24V comes from the W line, it represents that the air conditioner 1 is in a defrosting mode. Therefore, the outdoor unit controller 35 can determine the current working mode of the air conditioner 1 by determining the transmission line of the power-on signal.

For example, signals received by the four transmission lines N, B, Y, and W are "0100", and the bit "1" represents that a high-level signal of 24V is received. Since the bit "1" is in a second position, the transmission line of the power-on signal is the B line. The reception information can be determined based on the position of the bit "1" in the switching signal, and in turn it can be determined that the current working mode of the air conditioner 1 is the cooling mode.

It will be understood that the B line, the Y line, and the W line can transmit a high-level signal of 24V (i.e., the power-on signal) when the air conditioner 1 is in the temperature control state. Thus, the reception information corresponding to the power-on signal can be obtained based on the transmission line of the power-on signal, thereby obtaining the current working mode of the air conditioner 1. When the air conditioner 1 enters the temperature-controlled shutdown state, the B line, the Y line, and the W line no longer transmit the high-level signal of 24V (i.e., the power-on signal). Thus, the transmission line of the power-on signal cannot be obtained, and in turn corresponding reception information of the power-on signal cannot be obtained. In order that the outdoor unit controller 35 is still able to obtain the current working mode of the air conditioner 1 when the air conditioner 1 is in the temperature-controlled shutdown state, the outdoor unit controller 35 may acquire the reception information when receiving the power-on signal, and store the reception information, so that the reception information can be called to determine the current working mode of the air conditioner 1 when the air conditioner 1 is in the temperature-controlled shutdown state.

An implementation that the outdoor unit controller 35 controls the opening degree of the electronic expansion valve 37 according to the exhaust superheat degree when the current working mode of the air conditioner 1 is the heating mode will be described.

It will be noted that a temperature sensor is generally provided at an exhaust port of the compressor 33, which can detect an exhaust temperature of the compressor 33. The internal pressure of the first pipe and the saturation temperature corresponding thereto can be obtained by querying a preset temperature corresponding relationship. The exhaust superheat degree can be obtained by acquiring the exhaust temperature of the compressor 33 by the temperature sensor, querying the saturation temperature corresponding to the current internal pressure of the first pipe, and then making a subtraction between the exhaust temperature and the saturation temperature.

It will be understood that, by reducing the opening degree of the electronic expansion valve 37, a flow path resistance of the refrigerant passing through the electronic expansion valve 37 can be increased, and by increasing the opening degree of the electronic expansion valve 37, the flow path resistance of the refrigerant passing through the electronic expansion valve 37 can be reduced. Such an electronic expansion valve 37 can expand and depressurize the refrigerant flowing from the indoor heat exchanger 21 toward the outdoor heat exchanger 31 during the heating operation. After the refrigerant expands, both the pressure and the temperature of the refrigerant are reduced, so that the refrigerant flowing through the outdoor heat exchanger 31 has a low temperature to absorb heat from the outdoor air and is configured to achieve the purpose of heating. It will be seen that, in a case where states of other components do not change, the refrigerant can be expanded to cool down only by adjusting the opening degree of the electronic expansion valve 37, which can save the electric energy consumed by other components to cool the refrigerant.

In some embodiments, the opening degree of the electronic expansion valve 37 is controlled according to the exhaust superheat degree. It will be understood that the exhaust superheat degree can represent the output capacity of the compressor 33, i.e., the cooling capacity or the heating capacity. Therefore, by controlling the opening degree of the electronic expansion valve 37 according to the exhaust superheat degree, the opening degree of the electronic expansion valve 37 can compensate or suppress the output capacity of the compressor 33.

For example, if the exhaust superheat degree is higher than a target exhaust superheat degree, the opening degree of the electronic expansion valve 37 is increased, and if the exhaust superheat degree is lower than the target exhaust superheat degree, the opening degree of the electronic expansion valve 37 is decreased. The target exhaust superheat degree may be set according to actual needs, which is not limited in the present disclosure. It will be understood that, if the exhaust superheat degree is too high, it represents that the output capability of the compressor 33 is poor, and in this case, the opening degree of the electronic expansion valve 37 is increased for the purpose of auxiliary production capacity; if the exhaust superheat degree is too low, it represents that the output capacity of the compressor 33 is good, and in this case, the opening degree of the electronic expansion valve 37 is reduced to avoid excess capacity.

In some embodiments, when the current working mode of the air conditioner 1 is the heating mode, the opening degree of the electronic expansion valve 37 is controlled according to the exhaust superheat degree. It will be understood that the air conditioner 1 can work in the heating mode in both the temperature control state and the temperature-controlled shutdown state. Therefore, some embodiments are implemented when the air conditioner 1 is in the temperature control state and the temperature-controlled shutdown state. In other embodiments, the above way of controlling the opening degree of the electronic expansion valve 37 according to the exhaust superheat degree may also be implemented only when the air conditioner 1 is in the temperature control state or the temperature-controlled shutdown state. In addition, the opening degree of the electronic expansion valve 37 may also be set to be adjusted to a certain fixed opening degree, which is not limited herein.

Moreover, when it is determined that the current working mode of the air conditioner 1 is the cooling mode, since an indoor throttle is used, the opening degree of the electronic expansion valve 37 is kept unchanged, which is equivalent to a pipe.

Furthermore, it will be noted that the air conditioner 1 shown in FIG. 1 is illustrated by taking an example in which a throttling element is the electronic expansion valve 37. In other embodiments, the throttling element may also be other devices, such as a thermal expansion valve. In addition, in a case where energy saving is not considered, the above electronic expansion valve 37 may not be provided, which is not limited in the present disclosure.

The air conditioner 1 provided by some embodiments of the present disclosure has been described in detail in combination with FIGS. 1 to 6. It will be noted that, since only modification of the outdoor unit 3 is involved and modification of the indoor unit 2 is not involved, the outdoor unit 3 may be formed into an independent product which is available for sale, so as to replace the outdoor unit in the related art to realize modification of the air conditioner in the related art, thereby saving replacement cost of a whole machine. The outdoor unit 3 may also form into the air conditioner 1 shown in FIG. 1 with the indoor unit 2 shown in FIG. 1 to be sold.

Figure 7:
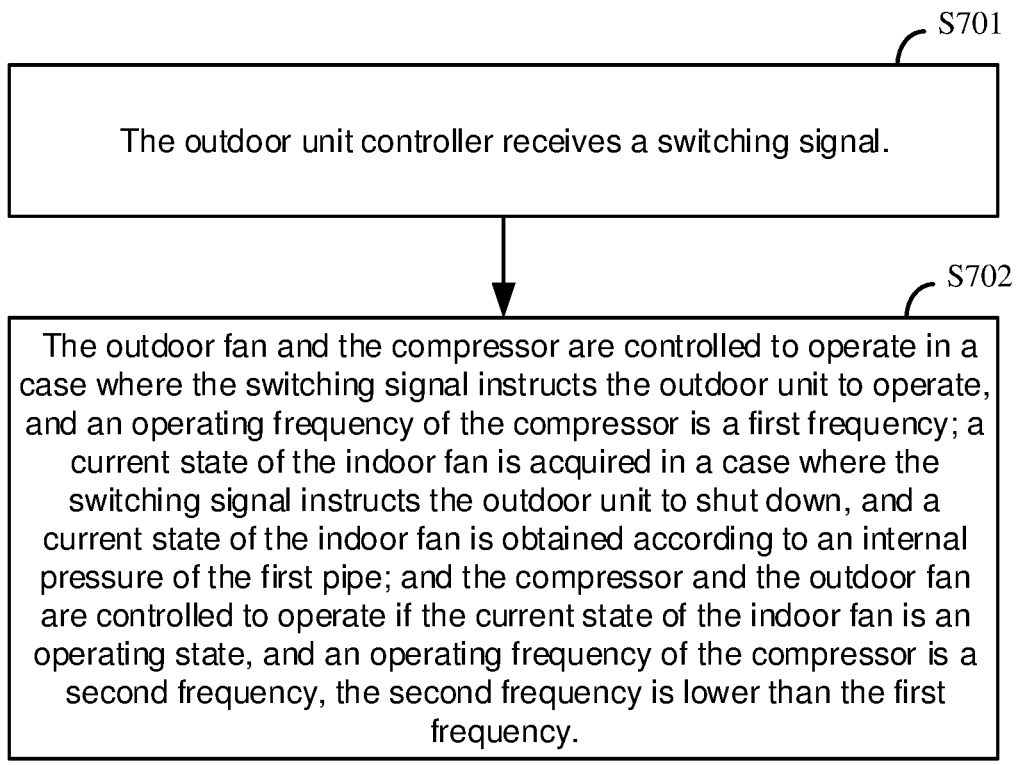
FIG. 7 is a schematic flowchart of a method for controlling an air conditioner according to some embodiments.

In addition, some embodiments of the present disclosure further provide a control method. FIG. 7 is a schematic flowchart of a method for controlling an air conditioner according to some embodiments. The method for controlling the air conditioner is applied in the outdoor unit as shown in FIGS. 1 to 6. The method for controlling the air conditioner includes the following steps 701 and 702.

In S701, the outdoor unit controller receives a switching signal.

In S702, the outdoor unit controller controls the outdoor fan and the compressor to operate in a case where the switching signal instructs the outdoor unit to operate, and an operating frequency of the compressor being a first frequency; the outdoor unit controller acquires a current state of the indoor fan in a case where the switching signal instructs the outdoor unit to shut down, and a current state of the indoor fan being obtained according to an internal pressure of the first pipe; and the outdoor unit controller controls the compressor and the outdoor fan to operate if the current state of the indoor fan is an operating state, and an operating frequency of the compressor being a second frequency, the second frequency being lower than the first frequency.

In some embodiments, the outdoor unit controller acquiring the current state of the indoor fan in the case where the switching signal instructs the outdoor unit to shut down, includes: the outdoor unit controller acquiring a change value of the internal pressure of the first pipe, the change value of the internal pressure of the first pipe being a difference between an internal pressure of the first pipe at a first moment and an internal pressure of the first pipe at a second moment, the second moment being later than the first moment and a critical moment; the outdoor unit controller determining that the current state of the indoor fan is an operating state if the change value of the internal pressure of the first pipe is less than or equal to a preset change threshold; and the outdoor unit controller determining that the current state of the indoor fan is a shutdown state if the change value of the internal pressure of the first pipe is greater than the preset change threshold.

In some embodiments, the second frequency is in a negative correlation with the internal pressure of the first pipe.

In some other embodiments, the second frequency is in a positive correlation with a room load.

In some embodiments, in a case where the switching signal instructs the outdoor unit to operate, the outdoor fan operates at a third frequency; in a case where the switching signal instructs the outdoor unit to stop operating and the current state of the indoor fan is the operating state, the outdoor fan operates at a fourth frequency; and the fourth frequency is less than or equal to the third frequency.

In some embodiments, the fourth frequency is in a positive correlation with the second frequency.

In some embodiments, the method for controlling the air conditioner further includes controlling the compressor and the outdoor fan to stop operating in a case, where the switching signal instructs the outdoor unit to stop operating and the current state of the indoor fan is the shutdown state.

In some embodiments, the outdoor unit further includes an electronic expansion valve. The electronic expansion valve is provided on the fifth pipe and the sixth pipe, and the fifth pipe and sixth pipe are pipes connecting the outdoor heat exchanger and the indoor heat exchanger; and the outdoor unit controller is further coupled to the electronic expansion valve. The method for controlling the air conditioner further includes: the outdoor unit controller acquiring a current working mode of the air conditioner, the current working mode of the air conditioner being obtained according to reception information, the reception information being used for indicating a transmission line of the power-on signal; and the outdoor unit controller controlling an opening degree of the electronic expansion valve according to an exhaust superheat degree in a case where the current working mode of the air conditioner is a heating mode, the exhaust superheat degree being a difference between an exhaust temperature of the compressor and a saturation temperature corresponding to the internal pressure of the first pipe.

For implementation and technical effects of the method for controlling the air conditioner provided in some embodiments of the present disclosure, reference is made to relevant descriptions in FIGS. 1 to 6, which will not be described herein again.

The logic and/or steps represented in flowcharts or otherwise described herein, for example, may be considered an ordered listing of executable instructions for implementing logical functions, may be embodied in any computer-readable medium for use by or in combination with an instruction execution system, apparatus, or device (e.g., a computer-based system, a system including a processor, or other systems that can fetch instructions from the instruction execution system, apparatus or device and execute the instructions). In the context of this specification, a "computer-readable medium" can be any apparatus that can contain, store, communicate, propagate, or transport a program for use by or in combination with an instruction execution system, apparatus, or device. For example, random access memory (RAM), read only memory (ROM), erasable programmable read only memory (EPROM or flash memory), fiber optic apparatuses, and portable compact disc read only memory (CDROM). In addition, the computer readable medium may even be paper or another suitable medium on which the program may be printed, as the program can be electronically captured via, for example, optical scanning of the paper or any other medium, then compiled, interpreted or otherwise processed in a suitable manner if necessary, and then stored in a computer memory.

The foregoing descriptions are merely specific implementations of the present disclosure, but the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:
1. An outdoor unit, comprising:
an outdoor fan configured to, when in an operating state, suck outdoor air into the outdoor unit and output heat-exchanged outdoor air from the outdoor unit;
an outdoor heat exchanger configured to perform heat exchange between the outdoor air and a refrigerant transported in the outdoor heat exchanger to obtain the heat-exchanged outdoor air;
a compressor configured to, when in an operating state, compress the refrigerant;
a pressure sensor configured to detect an internal pressure of a first pipe, the first pipe being a pipe connecting an indoor unit of an air conditioner, the indoor unit including an indoor heat exchanger, the first pipe being connected between the compressor and the indoor heat exchanger; and
an outdoor unit controller coupled to the pressure sensor, the compressor, and the outdoor fan, the outdoor unit controller being configured to:
receive a switching signal, the switching signal being a signal output by the indoor unit and used for instructing the outdoor unit to operate or shut down, the indoor unit further including an indoor fan including an operating state and a shutdown state;

control the outdoor fan and the compressor to be in an operating state in a case where the switching signal instructs the outdoor unit to operate, and an operating frequency of the compressor being a first frequency;

acquire a current state of the indoor fan in a case where the switching signal instructs the outdoor unit to shut down, the current state of the indoor fan being one of the operating state and the shutdown state, the current state of the indoor fan being determined according to an internal pressure of the first pipe; and control the compressor and the outdoor fan to operate if the current state of the indoor fan is the operating state, and an operating frequency of the compressor being a second frequency, the second frequency being lower than the first frequency.

2. The outdoor unit according to claim 1, wherein a moment when the outdoor unit controller receives the switching signal for instructing the outdoor unit to shut down is a critical moment; and the outdoor unit controller is configured to:

acquire a change value of the internal pressure of the first pipe in a case where the switching signal instructs the outdoor unit to shut down, the change value of the internal pressure of the first pipe being a difference between an internal pressure of the first pipe at a first moment and an internal pressure of the first pipe at a second moment, the second moment being later than the first moment and the critical moment;

determine that the current state of the indoor fan is the operating state if the change value of the internal pressure of the first pipe is less than or equal to a preset change threshold; and determine that the current state of the indoor fan is the shutdown state if the change value of the internal pressure of the first pipe is greater than the preset change threshold.

3. The outdoor unit according to claim 1, wherein the second frequency is in a negative correlation with the internal pressure of the first pipe in a case where the air conditioner is in a heating mode; and the second frequency is in a positive correlation with the internal pressure of the first pipe in a case where the air conditioner is in a cooling mode.

4. The outdoor unit according to claim 1, wherein in a case where the switching signal instructs the outdoor unit to operate, an operating frequency of the outdoor fan is a third frequency;

in a case where the switching signal instructs the outdoor unit to stop operating and the current state of the indoor fan is the operating state, the operating frequency of the outdoor fan is a fourth frequency; and the fourth frequency is less than or equal to the third frequency.

5. The outdoor unit according to claim 4, wherein the fourth frequency is in a positive correlation with the second frequency.

6. The outdoor unit according to claim 1, wherein the outdoor unit controller is further configured to control the compressor and the outdoor fan to be in the shutdown state if the current state of the indoor fan is the shutdown state.

7. The outdoor unit according to claim 1, further comprising a four-way valve, the four-way valve including a first port, a second port, a third port, and a fourth port, wherein, the first port is connected to the indoor heat exchanger through the first pipe, the second port is connected to the outdoor heat exchanger through a second pipe, the third port is connected to a discharge port of the compressor through a third pipe, the fourth port is connected to a suction port of the compressor through a fourth pipe.

8. The outdoor unit according to claim 1, wherein the switching signal for instructing the outdoor unit to operate is a power-on signal;

the outdoor unit further comprises an electronic expansion valve configured to connect two additional pipes, a first one of the additional pipes being a pipe connecting the outdoor heat exchanger, and second one of the additional pipes being a pipe connecting the indoor heat exchanger;

the outdoor unit controller is further coupled to the electronic expansion valve, and the outdoor unit controller is further configured to:

acquire a current working mode of the air conditioner, wherein the current working mode of the air conditioner is obtained according to reception information, and the reception information is used for indicating a transmission line of the power-on signal; and control an opening degree of the electronic expansion valve according to an exhaust superheat degree in a case where the current working mode of the air conditioner is a heating mode, wherein the exhaust superheat degree is a difference between an exhaust temperature of the compressor and a saturation temperature corresponding to the internal pressure of the first pipe.

9. The outdoor unit according to claim 1, wherein the second frequency is in a positive correlation with a room load.

10. The outdoor unit according to claim 9, wherein the room load corresponds to cooling capacity or heating capacity required by an air conditioner including the outdoor unit to stabilize an indoor temperature at a setting temperature.

11. The outdoor unit according to claim 9, wherein when an air conditioner including the outdoor unit is in a heating mode, the internal pressure of the first pipe is in a negative correlation with the room load; and when the air conditioner including the outdoor unit is in a cooling mode, the internal pressure of the first pipe is in a positive correlation with the room load.

12. An air conditioner, comprising:

the outdoor unit according to claim 1; and an indoor unit including an indoor heat exchanger, an indoor fan, and an indoor unit controller, the indoor unit controller being configured to control the indoor fan to switch between an operating state and a shutdown state and being further configured to control output of a switching signal, the switching signal being configured to instruct the outdoor unit to operate or stop operating.

13. A method for controlling an air conditioner, applied to an outdoor unit of the air conditioner;

the outdoor unit including:

an outdoor fan configured to, when in an operating state, suck outdoor air into the outdoor unit and output heat-exchanged outdoor air from the outdoor unit;

an outdoor heat exchanger configured to perform heat exchange between the outdoor air and a refrigerant transported in the outdoor heat exchanger to obtain the heat-exchanged outdoor air;

a compressor configured to, when in an operating state, compress the refrigerant;

a pressure sensor configured to detect an internal pressure of a first pipe, the first pipe being a pipe connecting an indoor unit of an air conditioner, the indoor unit including an indoor heat exchanger, the first pipe being connected between the compressor and the indoor heat exchanger;

an outdoor unit controller coupled to the pressure sensor, the compressor, and the outdoor fan;

the method for controlling the air conditioner comprising:

receiving, by the outdoor unit controller, a switching signal, the switching signal being a signal output by the indoor unit and used for instructing the outdoor unit to operate or shut down, the indoor unit further including an indoor fan including an operating state and a shutdown state;

controlling, by the outdoor unit controller, the outdoor fan and the compressor to be in an operating state in a case where the switching signal instructs the outdoor unit to operate, an operating frequency of the compressor being a first frequency;

acquiring, by the outdoor unit controller, a current state of the indoor fan in a case where the switching signal instructs the outdoor unit to shut down, the current state of the indoor fan being one of the operating state and the shutdown state, the current state of the indoor fan being determined according to an internal pressure of the first pipe; and controlling, by the outdoor unit controller, the compressor and the outdoor fan to operate if the current state of the indoor fan is the operating state, an operating frequency of the compressor being a second frequency, the second frequency being lower than the first frequency.

14. The method for controlling the air conditioner according to claim 13, wherein a moment when the outdoor unit controller receives the switching signal for instructing the outdoor unit to shut down is a critical moment; and acquiring the current state of the indoor fan in the case where the switching signal instructs the outdoor unit to shut down, includes:

acquiring, by the outdoor unit controller, a change value of the internal pressure of the first pipe, the change value of the internal pressure of the first pipe being a difference between an internal pressure of the first pipe at a first moment and an internal pressure of the first pipe at a second moment, the second moment being later than the first moment and the critical moment;

determining, by the outdoor unit controller, that the current state of the indoor fan is the operating state if the change value of the internal pressure of the first pipe is less than or equal to a preset change threshold; and determining, by the outdoor unit controller, that the current state of the indoor fan is the shutdown state if the change value of the internal pressure of the first pipe is greater than the preset change threshold.

15. The method for controlling the air conditioner according to claim 13, wherein the second frequency is in a negative correlation with the internal pressure of the first pipe in a case where the air conditioner is in a heating mode; and the second frequency is in a positive correlation with the internal pressure of the first pipe in a case where the air conditioner is in a cooling mode.

16. The method for controlling the air conditioner according to claim 13, wherein in a case where the switching signal instructs the outdoor unit to operate, an operating frequency of the outdoor fan is a third frequency;

in a case where the switching signal instructs the outdoor unit to stop operating and the current state of the indoor fan is the operating state, the operating frequency of the outdoor fan is a fourth frequency; and the fourth frequency is less than or equal to the third frequency.

17. The method for controlling the air conditioner according to claim 16, wherein the fourth frequency is in a positive correlation with the second frequency.

18. The method for controlling the air conditioner according to claim 13, wherein after acquiring the current state of the indoor fan, the method for controlling the air conditioner further comprises:

controlling, by the outdoor unit controller, the compressor and the outdoor fan to be in the shutdown state if the current state of the indoor fan is the shutdown state.

19. The method for controlling the air conditioner according to claim 13, wherein the switching signal for instructing the outdoor unit to operate is a power-on signal;

the outdoor unit further includes an electronic expansion valve configured to connect two additional pipes, a first one of the additional pipes is a pipe connecting the outdoor heat exchanger, and a second one of the additional pipes is a pipe connecting the indoor heat exchanger; and the outdoor unit controller is further coupled to the electronic expansion valve; and the method for controlling the air conditioner further comprises:

acquiring, by the outdoor unit controller, a current working mode of the air conditioner, wherein the current working mode of the air conditioner is obtained according to reception information, and the reception information is used for indicating a transmission line of the power-on signal; and controlling, by the outdoor unit controller, an opening degree of the electronic expansion valve according to an exhaust superheat degree in a case where the current working mode of the air conditioner is a heating mode, wherein the exhaust superheat degree is a difference between an exhaust temperature of the compressor and a saturation temperature corresponding to the internal pressure of the first pipe.

20. The method for controlling the air conditioner according to claim 13, wherein the second frequency is in a positive correlation with a room load.

* * * * *